Nov. 16, 1971          E. A. NORDELL          3,620,027
                        DOCK STRUCTURE

Filed April 15, 1968                    5 Sheets-Sheet 1

INVENTOR.
EDWIN A. NORDELL
BY *Jack M. Young*
ATTORNEY

Nov. 16, 1971  E. A. NORDELL  3,620,027
DOCK STRUCTURE

Filed April 15, 1968  5 Sheets-Sheet 2

INVENTOR.
BY EDWIN A. NORDELL
Jack M. Young
ATTORNEY

Nov. 16, 1971  E. A. NORDELL  3,620,027
DOCK STRUCTURE
Filed April 15, 1968  5 Sheets-Sheet 5
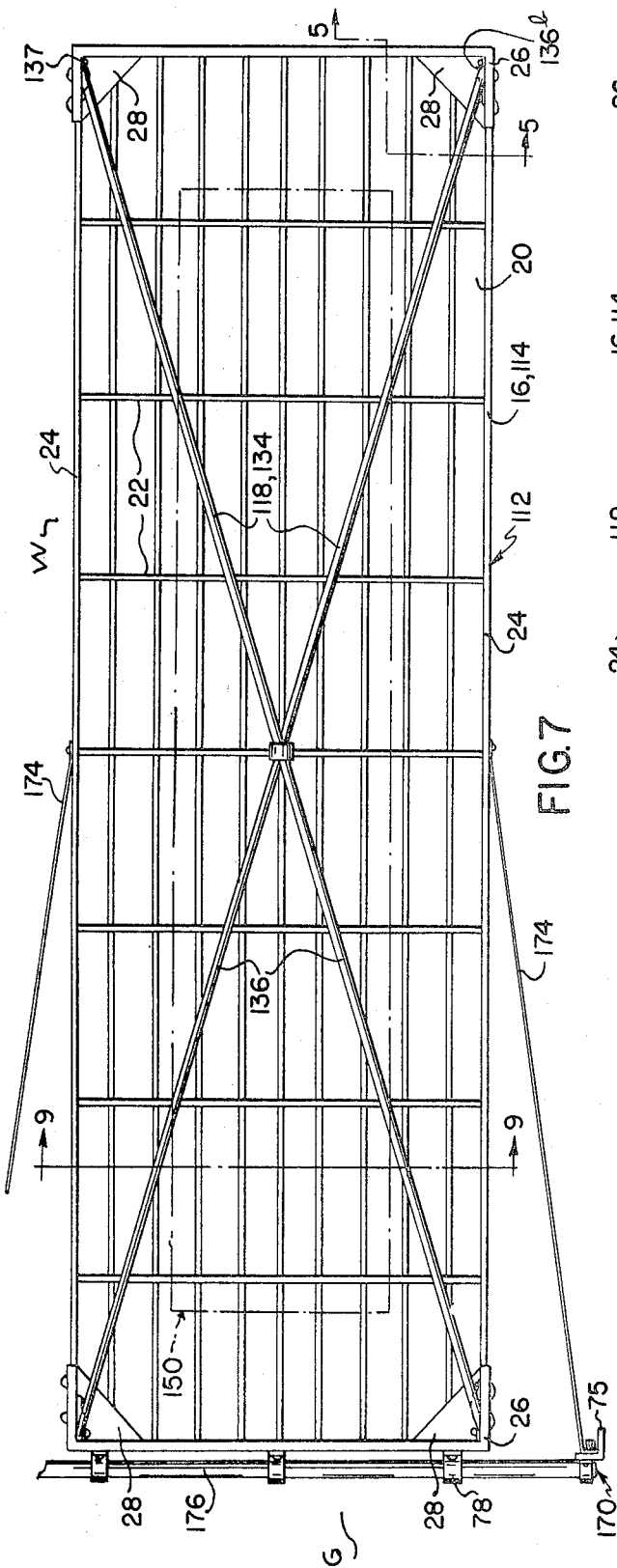
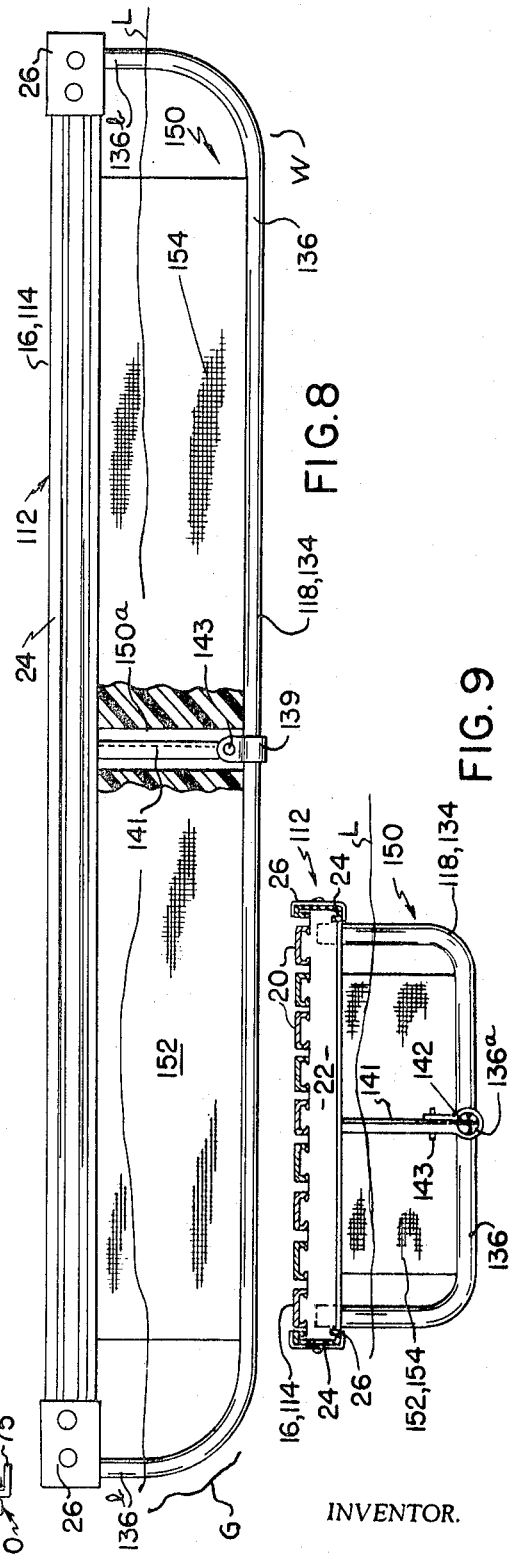
INVENTOR.
EDWIN A. NORDELL
BY Jack M. Young
ATTORNEY

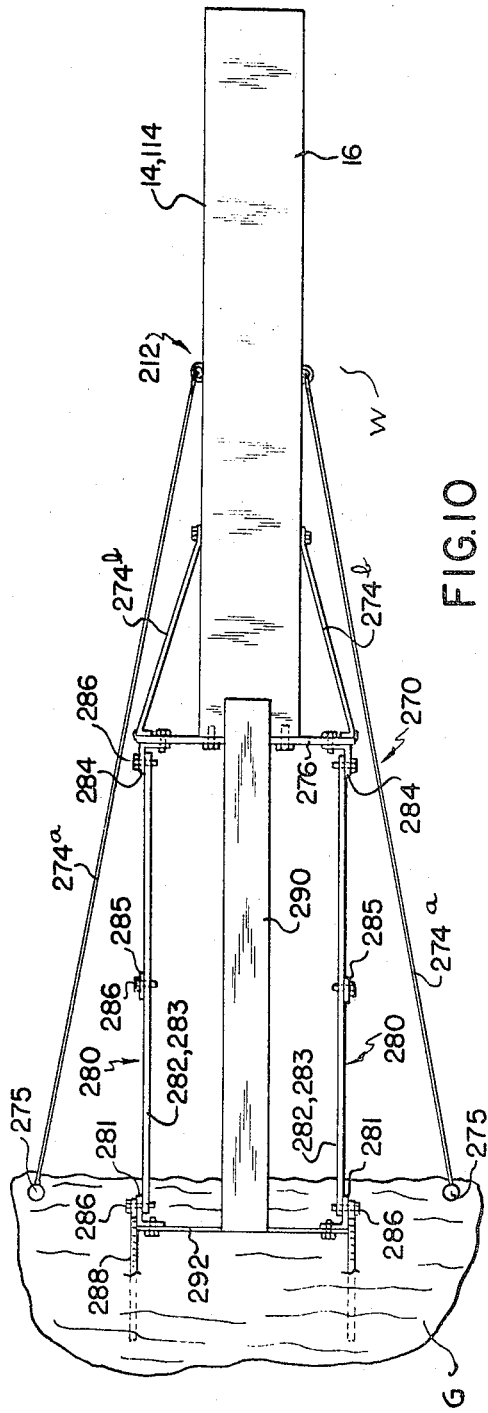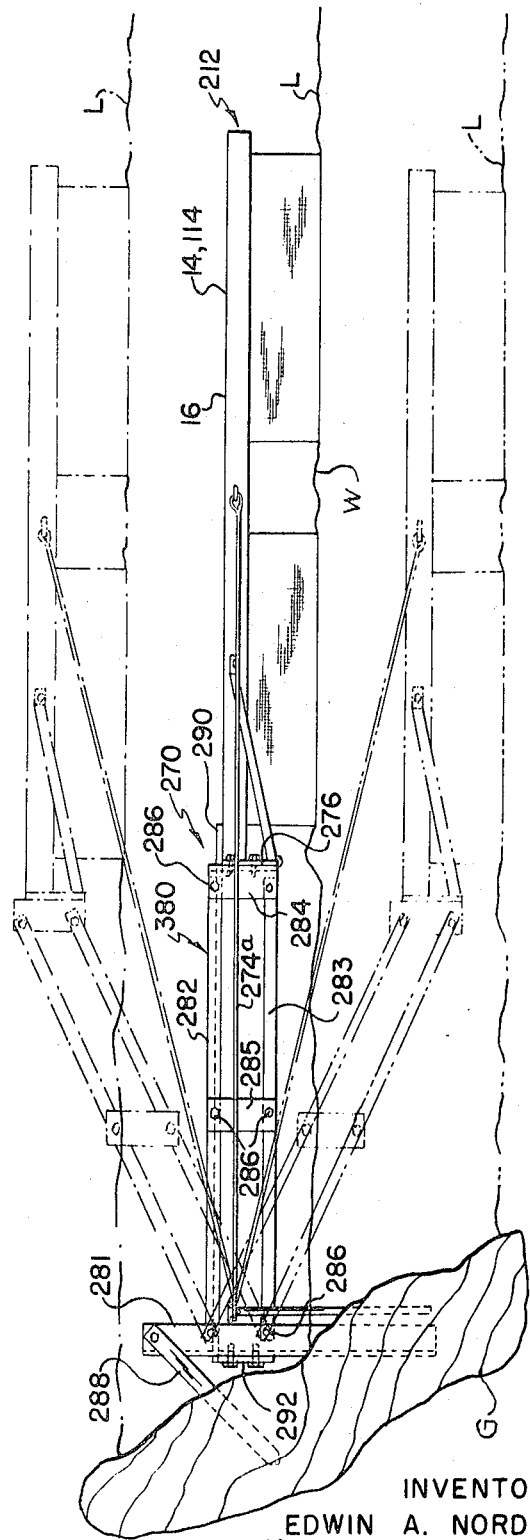

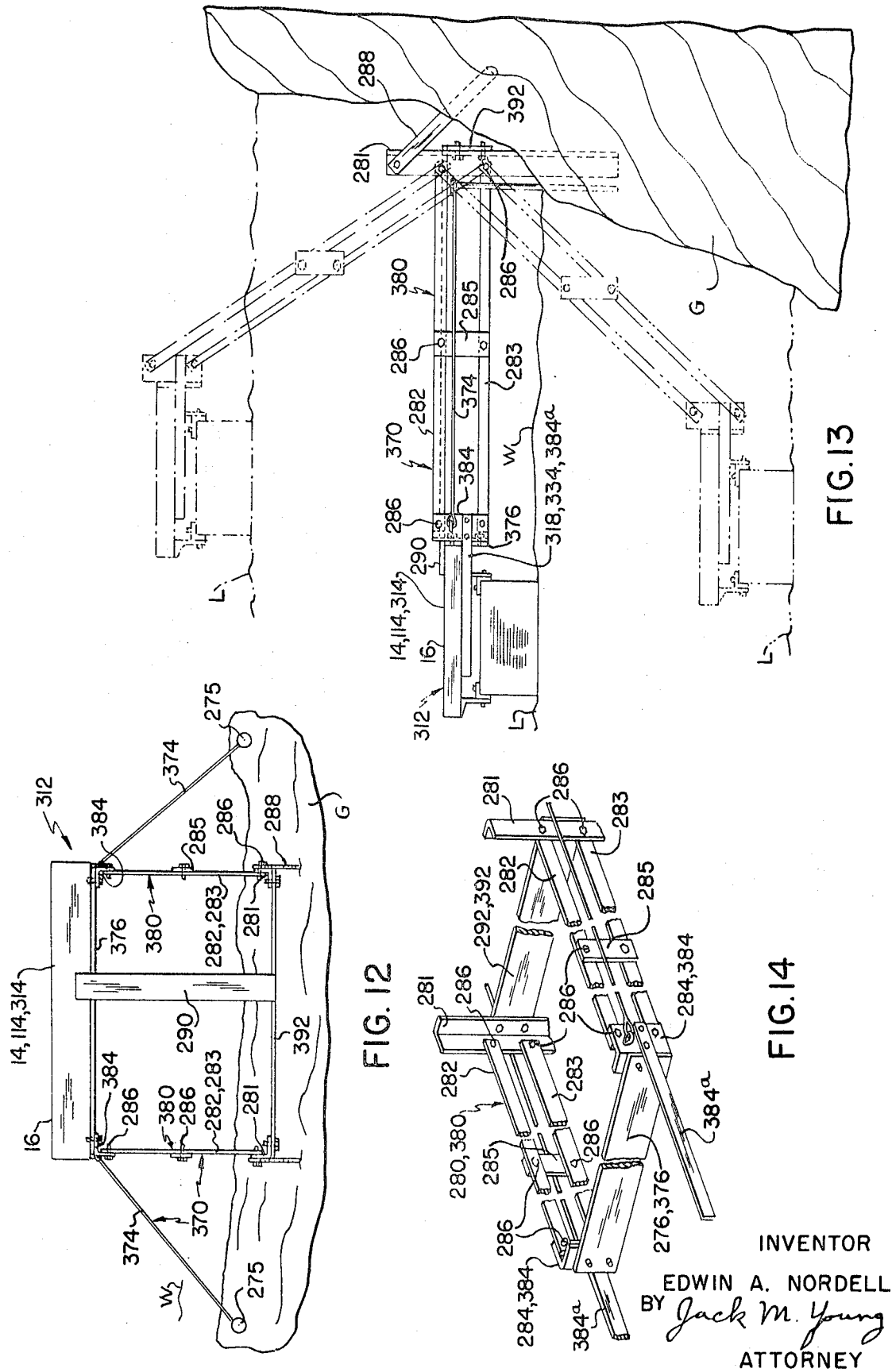

United States Patent Office 3,620,027
Patented Nov. 16, 1971

3,620,027
DOCK STRUCTURE
Edwin A. Nordell, Lyndhurst, Ohio, assignor to The Metal Craft Company, Chardon, Ohio
Filed Apr. 15, 1968, Ser. No. 721,386
Int. Cl. E02b *3/06;* E04b *5/02;* B63b *35/58*
U.S. Cl. 61—48                                   7 Claims

ABSTRACT OF THE DISCLOSURE

A dock structure wherein a dock member, forming a component of a dock, has a deck portion formed of interlocking thin members rigidly connected together, is constructed to resist distortion and torsional twist, and is adapted to be anchored either rigidly at one end to shore or so as to rise and fall with the water level floating it.

BACKGROUND AND SUMMARY OF THE INVENTION

This invention relates to dock structures, including dock members, docks, and the construction of one dock member in a single-section dock or one or more dock members in a multi-section dock.

A dock member of light weight construction is desirable because it is easier to transport; erect; and if necessary, disassemble for removal either to a new location or for winter storage. However, a dock member must be sufficiently rigid to permit walking thereon and to resist distortion thereof. The dock members of the present invention combine the advantage of light weight and sufficiently rigid constructions.

The dock members are for a floating type dock, as disclosed herein, or for a permanent type dock.

The dock member disclosed herein is of modular construction readily transported in small, easy-to-handle modular components; assembled in the water into the form of a dock; and disassembled for either storage or movement to a new location, whenever desired.

One form of dock has one end anchored to shore while the other end floats in the water; and another form of dock completely floats with means for keeping the deck portion thereof level at all float levels.

An object of the present invention is to provide a dock member characterized by its light weight, but still rigid, construction.

A further object of the present invention is to provide a dock member characterized by its use in either a stationary or floating dock; light weight modular construction; imperviousness to weather and water; resistance to rust and rot; absence of splinters thereon; permanent material character; attractiveness; distinctiveness; ease of assembly of its component parts, structural simplicity, strong and sturdy nature, operating efficiency, ease of operation and use, inexpensive manufacturing cost, and compactness on disassembly for shipment.

Other objects, novel features and additional advantages of the present invention will become more clearly apparent from the appended claims as the detailed description and discussion hereafter proceed in conjunction with the accompanying drawing.

BRIEF DESCRIPTION OF THE DRAWING

In the drawing.

FIG. 7 is a bottom plan view of a second form of floating dock having the same deck portion (but a different torsion resisting portion means and float construction), with the float block and its mounting being schematically shown in dot-dash lines to avoid obstructing the view of the framework of the dock, and with the upper end of the anchoring means cut off at its shore end;
FIG. 8 is a side elevational view of the dock form in FIG. 7 omitting the anchoring means on the left in FIG. 7;
FIG. 9 is a transverse, vertical sectional view taken generally along the line 9—9 in FIG. 7 but with the guy braces omitted;
FIG. 10 is a top plan view of a third form of floating dock extending perpendicular to the shore line and using a dock member (of either the first dock form in FIGS. 1–6 or the second dock form in FIGS. 7–9), shown only schematically in FIGS. 10 and 11;
FIG. 11 is a side elevational view of the third dock form in FIG. 10 with various float positions shown in dot-dash and solid lines;
FIG. 12 is a top plan view of a fourth form of floating dock extending parallel to the shore line and using either only the deck portion or a dock member from any of the dock forms in FIGS. 1–9, which is shown only schematically in FIGS. 12 and 13;
FIG. 13 is a side elevational view of the fourth dock form in FIG. 12 with various float positions shown in dot-dash and solid lines;
and
FIG. 14 is a detached, side elevational view of a parallelogram linkage and some appurtenant parts thereof used in the third and fourth dock forms shown in FIGS. 10–13, inclusive.

DETAILED DESCRIPTION OF THE PREFERRED EMBODIMENTS

Figure 1:
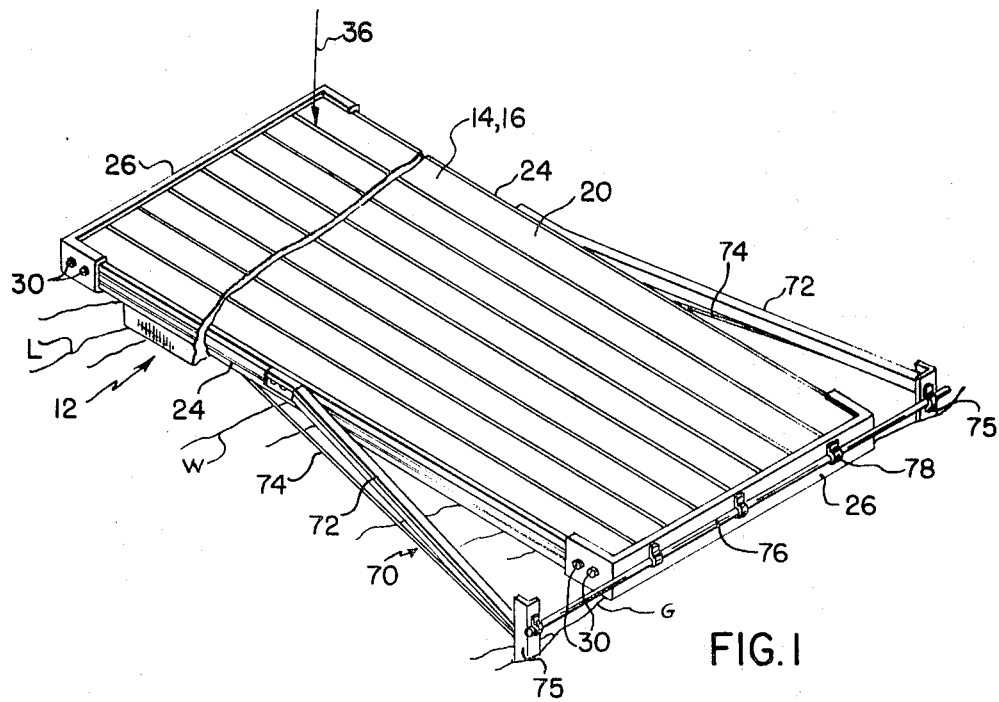
FIG. 1 is a perspective view of a first form of floating dock in the present invention with the length of the dock broken away to present a foreshortened dock.

A plurality of different forms of docks are illustrated in the drawings, including dock 12 in FIGS. 1–6; dock 112 in FIGS. 7–9; dock 212 in FIGS. 10 and 11; and dock 312 in FIGS. 12 and 13.

Frequently hereafter a single description will be used to describe generically at one time the generic features of a plurality of these different docks 12, 112, 212 and 312. Wherever possible for ease of understanding but not for limiting the invention in any way, reference numerals 0–99 will be used for components of dock 12, 100–199 for dock 112, 200–299 for dock 212, and 300–399 for dock 312. Wherever possible, reference numerals 0–99 will be used on all correspondingly constructed and functioning parts in all four dock forms, and correspondingly functioning parts in all four dock forms will bear the same tens and units reference number but may vary in the hundred series.

Each dock includes a dock member of suitable form—dock member 14 in FIGS. 1–6; dock member 114 in FIGS. 7–9; or dock member 314 in FIGS. 12–14. Dock 212 in FIGS. 10–11 may use either form of dock member 14 or 114; and dock 312 in FIGS. 12–13 may use any form of dock member 14, 114 and 314 but with dock member 314 described in detail for it hereafter.

Docks 12 and 112 have one end secured to shore or ground G and the other end floating in water W at level L, as shown by dock 12 in FIG. 1; while docks 212 and 312 float at both ends in water W at level L. Dock 112, because of its vertical thickness, requires deeper water near shore for anchoring on shore G.

Although docks 12, 112, 212 and 312 are floating docks floating on water surface or level L, it should be readily apparent that any of these docks members (14, 114 or 314) may be used as a component section of any form of dock, such as a stationary dock; and any dock may be comprised of a plurality of interconnected sections with each section including one form of these dock members.

Each dock member includes a deck portion and support structure for said deck portion. All dock members have the same deck portion 16; while dock member 14 has a support structure 18, dock member 114 has support structure 118, and dock member 314 has support structure 318.

Deck portion 16 (shown in detail in FIGS. 1–9 and schematically in FIGS. 10–13) comprises a plurality of C-shaped, channel, deck, floor members or deck extrusions 20 interlocked with a plurality of notched, rigidfying members or deck supports 22, which are spaced about 15 inches apart in one suitable form of deck construction. Deck portion 16 also includes edge closer members 24, U-shaped channeled members 26 with corner gussets 28.

Deck portion 16 is easily assembled from its component members by following these sequential steps.

First, floor members 20 are placed upside down on a flat surface in generally parallel arrangement, similar to that shown in FIG. 1 but inverted, and preferably in a frame-type jig confining members 20 to define the rectangular peripheral form of deck portion 16.

Figures 5, 6:
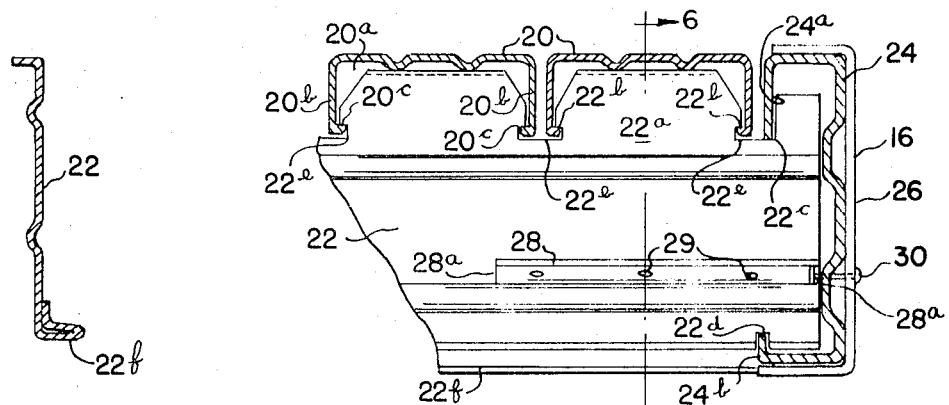
FIG. 5 is a partial, vertical sectional view taken generally along the lines 5—5 in FIGS. 2 and 7 through only the deck portion of the dock.
FIG. 6 is a vertical sectional view taken generally along the line 6—6 in FIG. 5 through only the transversely extending rigidifying member or deck support of the deck portion.
Figure 2:
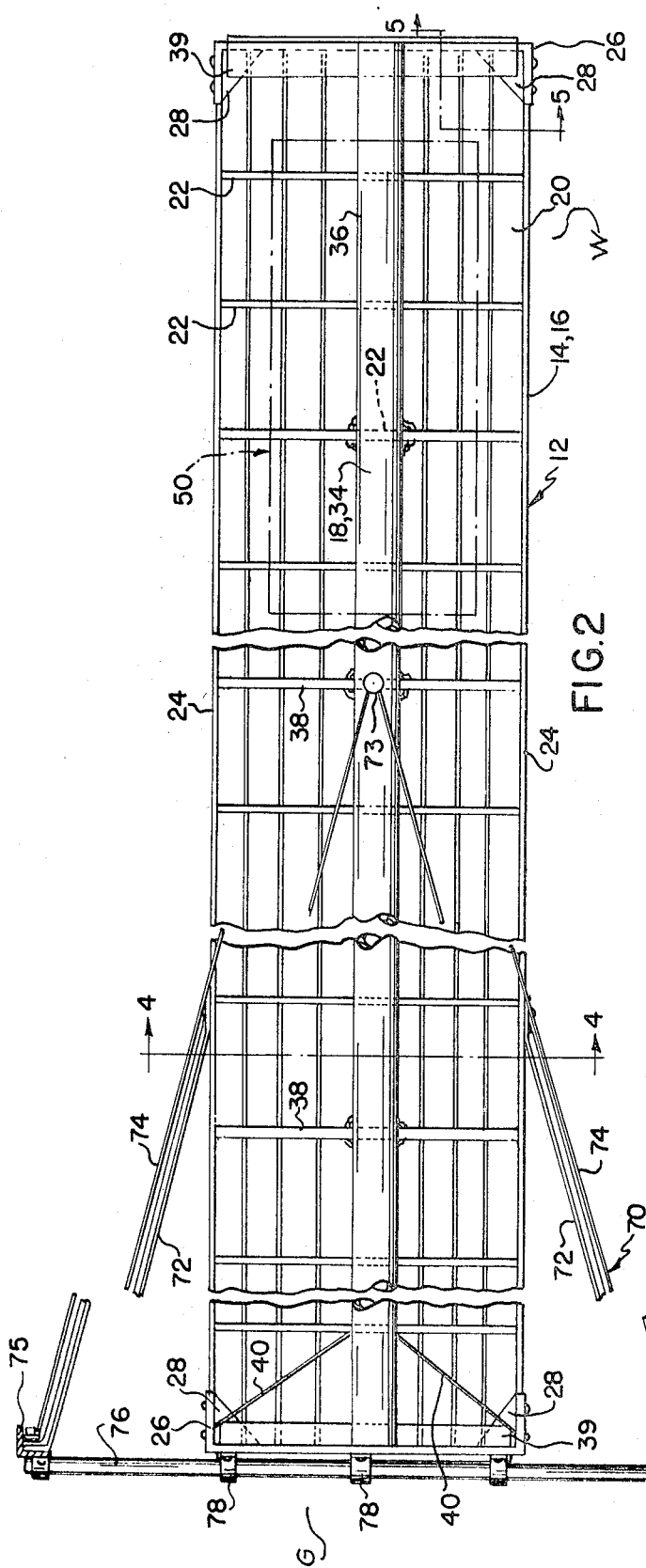
FIG. 2 is a bottom plan view of the dock in FIG. 1 with the float block and its mounting being schematically shown in dot-dash lines to avoid obstructing the view of the framework of the dock.

Second, one rigidifying member 22 is turned upside down with each of its tongues 22a entering into one channel 20a of each floor member 20 between each pair of their generally parallel arms 20b. The upper edges of each tongue 22a in FIG. 5 are tapered to permit easy start of this insertion. Member 22 then extends transversely to the lengthwise dimension of deck portion 16 but is acutely angled with respect to the plane of floor members 20 instead of being perpendicular thereto, as shown in FIGS. 2 and 5. Then, member 22 is driven with a hammer into floor members 20, by striking a blow coplanar with member 22, until barb-like shoulders 22b on member 22 move past and interlockingly engage with turned-in end 20c on the distal end of each arm 20b.

Third, member 22 is swung about the horizontal transverse axis of deck portion 16 into its vertical position relative to the plane of floor members 20, as shown in FIGS. 2 and 5. Then, shoulders 22b dig into turned-in ends 20c, as shown in FIG. 5, to hold members 20 and 22 in rigid alignment. The remaining members 22 may be driven into members 20 in the same manner while the surrounding jig maintains the alignment of floor members 20.

Fourth, two edge closer members 24 may be connected, one as each side of deck portion 16, by sliding in FIG. 5 longitudinally its lips 24a and 24b, located on the distal ends of its C-shaped section, into aligned channels 22c and 22d on the corresponding ends of members 22. Longitudinal edge closer members 24 are channel shaped to fit into these notches or channels 22c, 22d on corresponding ends of rigidifying members 22.

Fifth, after surrounding frame-type jig has been removed, two U-shaped channeled members 26 are telescoped over the opposite ends of the aforedescribed members 20, 22 and 24 to hold them in a rigid deck portion 16.

Sixth, two corner gussets 28 in FIGS. 2 and 7 are secured to the two corners of each of U-shaped channeled members 26 to rigidify them. Each gusset is generally triangular shaped (as shown in FIGS. 2, 5 and 7) with a turned down flange 28a along each right angular edge so that bolts 29 (shown only in FIG. 5) secure one of these flanges to the end of member 26 while other bolts 30 secure the other flange to one of the parallel legs of member 26 and to the corresponding edge closer member 24, as shown in FIGS. 1, 2, 5, and 7.

The completely assembled deck portions 16 is strong, rigid, made of modular components, and light in weight. Floor members 20, rigidifying members 22, and notches 22e between tongues 22a in member 22 are constructed so that C-shaped channels 20a in members 20 interlockably fit into notches 22e with deck floor members 20 forming a planar walkway on the top side in FIG. 1 and being rigidly connected on the bottom, or other side, by spaced apart and parallel rigidifying members 22 extending generally perpendicular to deck floor members 20 and transversely to the length of deck portion 16. The component members 20, 22, and 24 interlock like parts of a jigsaw puzzle to form a rigid structure without bolts or welding. End channel members or brackets 26 square up the structure for connection to boat docking posts, anchoring hardware, etc., some of which is described in more detail hereinafter. These members are interlocked for maximum strength and rigidity even though each of these members 20, 22, 24 and 26 may be a relatively thin aluminum extrusion; and all members so tied together will help carry the load on the dock. The tying together here is shown by the interlocking action, but instead may be by use of specially designed clips or by welding, riveting, bolting, etc., or any combination of any two or more of these fastening arrangements. One purpose of this construction is to create an extremely light weight but sufficiently strong dock made up of modules, easy to install in the spring and to remove in the fall. This dock construction will also permit a twisting action to take place, in case one dock supporting or anchoring post or pipe settles down more than the others, without damage to the dock; permits easier installation and removal of the dock; and may be called an "orthotropic" construction.

Support structure 18 in FIGS. 1–6, support structure 118 in FIGS. 7–9, and support structure 318 in FIGS. 12–14 are provided for deck portions 16 in these respective drawing figures; and respectively include torsion resisting portion means 34 in FIGS. 1–6, 134 in FIGS. 7–9, and 334 in FIGS. 12–14 resisting relative torsional movement of longitudinally spaced apart transversely extending sections of deck portion 16 to resist any twisting force applied to the deck portion. This twisting may occur as a person walks across the top of floor members 20 of deck portion 16 out toward the outer end of the dock or when he stands on one outer corner of the dock to exert a downward force thereon, such as shown by force arrow 36 in FIG. 1. Then, the twisting force is transmitted to, and resisted by, the torsion resisting portion means so as to make a rigid dock even though deck portion 16 is formed of relatively thin and flexible members.

Torsion resisting portion means 34, 134 and 334, and their corresponding connection means, will each be described separately hereafter in the following paragraphs to disclose the specific structure in each.

Figure 4:
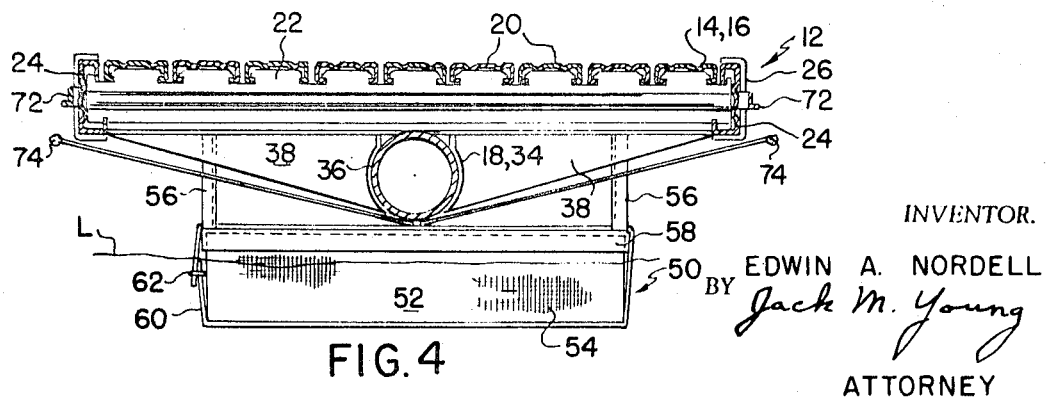
FIG. 4 is a vertical transverse sectional view taken generally along the line 4—4 in FIG. 2.
Figure 3:
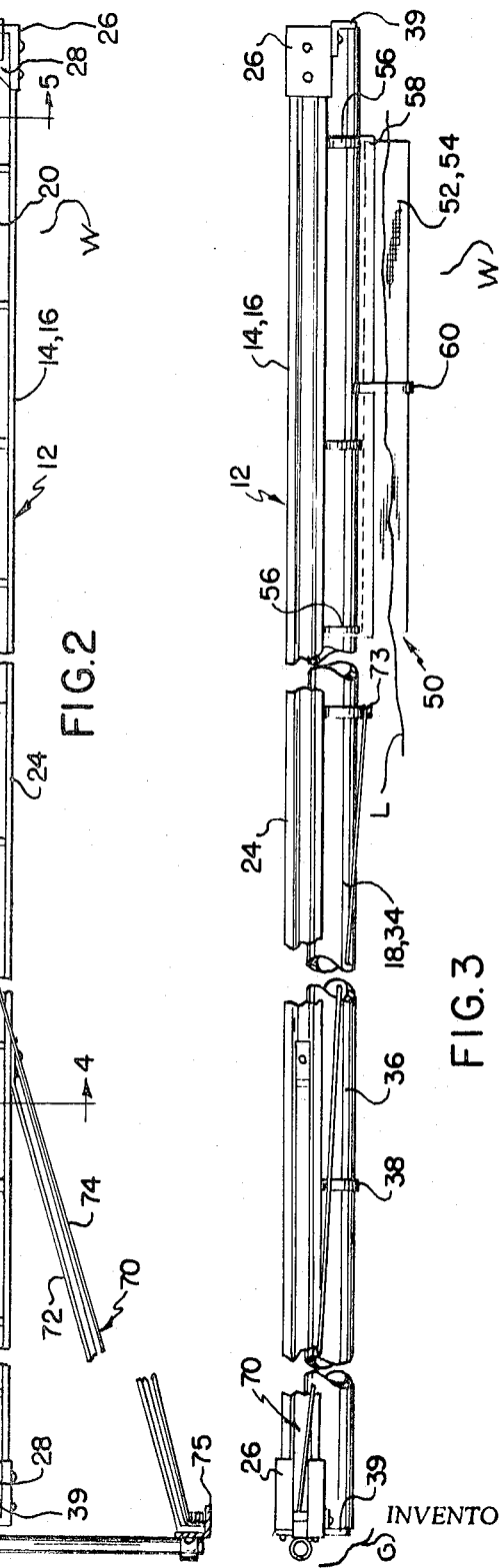
FIG. 3 is a side elevational view of the dock in FIGS. 1 and 2.

Torsion resisting means 34 in FIGS. 2, 3 and 4 include torsion resisting beam, tube or pipe 36 (generically called herein torsion resisting bar or bar to include both tubular, channeled or solid bars) extending longitudinally of, and under, deck portion 16 intermediate the sides of this deck portion. Connecting means includes transversely extending braces 38 spaced along torsion resisting tube 36 and rigidly connecting deck portion 16 and tube 36. One brace 38 is secured by bolts to lower flange 22f of every third rigidifying member 22 in generally coplanar arrangement and is welded to tube 36. There may be provided if desired in FIGS. 2, 3 and 4 end transverse braces 39, angle shaped in cross section and of the same outline shape as brace 38 transverse to deck portion 16, welded or bolted to each end and top of tube 36 and bolted to the bottom flange of channel member 26. In FIG. 2, there may be provided if desired two diverging braces 40, 40 secured at opposite ends to torque tube 36 and corners of deck portion 16 to serve as part of the torque resisting structure.

Torsion resisting means 134 in FIGS. 7–9 and its connecting means, include two U-shaped tubes 136 arranged in a cross under deck portion 16. Distal ends 136b of these tubes are secured to the respective bottom corners of deck portion 16 by brackets 137 bolted on the inner faces of end members 26. Tubes 136 are secured together at their cross intersection, which in turn is secured to the mid-portion of deck portion 16. Tubes 136 are flattened into half round flattened portions 136a in FIG. 9 secured together by a vertically extending rivet or bolt 142. Angle bar 141 is welded at its upper end to the midpoint of the center deck rigidifying member 22 and strap 139 wraps around flattened tube portions 136a at their cross over point with the distal ends of the strap bolted to the lower end of bar 141 by bolt 143.

Torsion resisting means 334 in FIG. 13, and its associated connecting means, include component parts of anchoring means 370 to be described in more detail hereinafter. It should suffice at this point to say that in FIGS. 13 and 14 each of the two arms 384a of links 384 is rigidly connected, such as by welding to, the lower side of deck portion 16 at spaced apart points along the longitudinal dimension of deck portion 16 along the full transverse length of deck portion 16, such as each being welded along the full length of a bottom flange 22f of a rigidifying member 22. Two such arms 384a are provided with one located at each end of deck portion 16 in FIGS. 12 and 13 to be longitudinally spaced along deck portion 16. Since parallelogram linkage 380 in FIGS. 12 and 14, to be described in more detail hereinafter, keeps these arms 384a always in parallel alignment and in a horizontal plane, this structure will resist relative torsional movement of the transversely extending end sections of deck portion 16 to provide the torsion resisting portion means earlier described.

Suitable float means 50 in FIGS. 1–4 and 150 in FIGS. 7–9 support the respective docks at level L in water W under deck portion 16 by a pontoon-style float. Float means 50 and 150 include respectively float blocks 52 and 152, each including solid, right parallelepiped in peripheral shape, floatable plastic foam block (such as polystyrene, commonly bearing the trademark Styrofoam) completely surrounded by fine mesh aluminum protecting screen 54 and 154 respectively. If desired, any other floatable material may be used instead, such as wood, cork, etc.

Float means 50 in FIGS. 3 and 4 includes a mounting for float block 52. Four legs 56 are welded at the upper ends to the bottom of deck portion 16 and at their lower ends to the corners of four-sided rectangular frame 58 with the component parts of the legs and frame being angle members. The L-shaped angle flanges on frame 58 form a pocket facing downwardly in which is upwardly seated float block 52 held in position by metal strap 60, surrounding opposite legs of frame 58 and float block 52 and having its distal ends tied together by strap tie 62 in a conventional manner.

Float means 150 in FIGS. 7–9 includes a mounting for float block 152. This mounting takes the form of the pocket formed between the bottom of deck portion 16 and the upper sides of U-shaped tube 36 in the crossed formation in FIGS. 8 and 9. Hole 150a through the center of float block 152 accommodates strap 139 and angle bar 141.

The float means on the docks in FIGS. 10–13 of the drawings are shown diagrammatically since either float means 50 or 150 may be used. If both ends of the dock are to be supported (such as in FIGS. 11 and 12) and dock member 14 is used, float means 50 may be duplicated under the left end of dock member 14 in FIG. 3, as shown in FIG. 11, if such dock member 14 is used in FIG. 11 or 12.

The component parts of the dock structures shown in the drawings may be made of any suitable material. The heretofore described components can each be made of aluminum, except for the bolts, but may be made of steel, if so desired. The components described hereafter, and these bolts, are generally made of galvanized or stainless steel; and these include anchor components, guy braces, bolts, pipes, etc.

Anchoring means is provided for anchoring the torsion resisting portion means and at least one edge of the deck portion to ground G against twist so that the torsion resisting means will resist any twisting force applied to the deck portion and for anchoring the dock to ground G against movement by current flow. This anchoring means is shown as anchoring means 70 in FIGS. 1–4, 170 in FIG. 7, 270 in FIGS. 10 and 11 and 370 in FIGS. 12 and 13. Each anchoring means may include an anchoring member (76, 176, 276 and 376 respectively in FIGS. 1–3, 7, 10–11 and 12–13) rigid with deck portion 16 and/or torsion resisting portion 34, 134 or 334 and extending along one dimension of deck portion 16.

Each anchoring means 70, 170, 270 and 370 may include one or more diverging guy braces to prevent swinging of the floating dock through an arc around the shore G anchored edge thereof by water current flow or wave movement. Frequently, only one diverging guy brace is required on the upstream side of the dock since that is the side exposed to the force of current flow, but two diverging guy braces are preferred. Each guy brace may consist of a guy rope, guy angle, guy bar, guy link, or any combination thereof. The drawings show in FIGS. 1 and 2 two guy bars 72 and two guy ropes 74; in FIG. 7 two guy ropes 174; in FIG. 10 two guy ropes 274a and 274b; and in FIG. 12 two guy ropes 374 with each such rope herein defined as including a cable, wire, cord, rope, etc. Each pair of diverging diagonal guy braces (ropes or bars) are connected at their closely spaced together ends to their associated docks and are connectable at their other diverged ends to ground G supporting the dock. Guy ropes 74 in FIGS. 2–4 are connected at their closely spaced together ends to bolt 73 secured to the bottom of torsion tube 36. Guy bars 72 (shown as an angle but may be a pipe, if desired) in FIGS. 1 and 2, guy ropes 174 in FIG. 7, guy ropes 274a and 274b in FIG. 10 and guy ropes 374 in FIG. 12 are each connected by bolts or eyes at their closely spaced together ends to a side of dock portion 16. All guy links 72 and guy ropes 74 in FIGS. 1 and 2, guy ropes 174 in FIG. 7, guy ropes 274a in FIG. 10, and guy ropes 374 in FIG. 12 are each connected at their diverged ends to post 75 or 275 of angle form or pipe form driven into ground G supporting the dock. The upper, shore side of guy ropes 174, post 75, etc., have been omitted in FIG. 7 but are a mirror-image of those illustrated on the lower side. The diverged ends of guy ropes 274b in FIG. 10 are connected at their outer ends to anchoring member 276 in turn connected to ground G supporting the dock through the structure at the left of deck portion 16 in FIG. 10, instead of by post 275.

Anchoring means 70 in FIGS. 1 and 2, 170 in FIG. 7, 270 in FIGS. 10 and 14, and 370 in FIGS. 12 and 14 each include respectively an anchoring member in the form of cross bar or pipe 76 or 176 attached by one or more brackets 78 to the ground end dock surface portion or deck portion closure member 26 by one or more pipe brackets bolted thereto or in the form of cross bar 276 or 376 bolted to one edge of deck portion 16. These serve as an anchoring member 76 rigid with deck portion 16 and extending along one dimension of that deck portion, either the narrow transverse dimension in FIGS. 1, 7 and 10 or the lengthwise dimension in FIG. 12. In FIGS. 1, 2 and 7, the opposite ends of pipe 76 are rigidly secured to the ground by being bolted to posts 75, so as to resist relative movement between the ground and the dock thereat, while bars 276 and 376 in FIGS. 10 and 12 respectively are anchored to the ground through linkages 280 and 380 by post 281 to be described in more detail hereinafter.

FIGS. 10–14 show anchoring means 270 and 370, each including means for keeping deck portion 16 always floating in a level position during rise and fall of water level L and deck floating position by using respectively one or more parallelogram linkages 280 and 380 shown in FIGS. 10–15.

Each parallelogram linkage 280 or 380 includes four, parallelogram arranged, oppositely parallel, links 281, 282 and 283, and either link 284 in linkage 280 or link 384 in linkage 380 connected by four corner parallel pivots 286 having horizontal axis, and may include if desired an intermediate strengthening link 285 pivotally connected to links 282 and 283 by two pivots 286. Each parallelogram linkage has four links pivotally connected together in a parallelogram shape and located in a generally vertical plane in FIGS. 10–13 with a pair of these parallelogram linkages 280 or 380 being shown schematically in FIG. 14. Each link may be of any suitable construction, such as a tube, channel, angle or pipe. Link 281 is secured to the ground or river bank by a tube, channel or angle serving as ground stake 288 in FIGS. 10–13 driven into the ground along with link 281 at a 45° angle therebetween with stake 288 and link 281 bolted together at their top vertex. Opposite link 284 is secured to deck portion 16 of dock 212 in FIGS. 10 and 11 and opposite link 384 is secured to deck portion 16 of dock 312 in FIGS. 12 and 13 so that upon rise and fall of water level L in FIGS. 11 and 13, the respective linkages 280 and 380 will keep deck portion 16 of docks 212 and 312 floating in a level position on water surface L. Only a single such linkage 280 or 380 may be required on each dock to cause the dock to float properly in this manner because of the parallelogram structure and action.

Although only a single parallelogram linkage 280 or 380 has been described for each dock, a plurality of such linkages for each dock is a preferred construction. If the dock deck portion has considerable length, such as in FIG. 12, two or more such linkages 380 might be required to keep deck portion 16 in a level position for all changes in level or height L of the water. Two parallelogram linkages 280 and 380 are illustrated respectively in FIGS. 10 and 12 with a pair of parallelogram linkages in each drawing figure generally horizontally aligned, having corresponding pivots 286 coaxial, and having one corresponding link 284 or 384 in each rigidly connected with the deck portion along one dimension of deck portion 16, such as the width dimension in FIG. 10 or the length dimension in FIG. 12. Also, gangplank or walkway 290 may be located between each pair of parallelogram linkages in FIGS. 10 and 12 to give a stable walkway between the dock and ground G by having it operatively connected to shore ground G in any sort of a manner, such as to form a horizontal pivot, and connected with dock portion 16 between the linkages and approximately coplanar with upper links 282 so as to pivot approximately the same as upper link 282. This provides a stable walkway with these parallelogram linkages maintaining the dimension of deck portion 16 between links 284 or 384 generally horizontal upon rise and fall of the water and floating level L of the dock so as not to tilt either walkway 290 or deck portion 16. See, for example, the plurality of different floating positions in FIGS. 11 and 13.

Links 284 and 384 are rigidly connected with their associated dock deck portions 16. Links 284 and 384 respectively are connected by bolts to the outer ends of cross bars 276 and 376 in turn rigidly connected by bolts to the end edge of deck portion 16 in dock 212 in FIG. 10 or the side edge of deck portion 16 in dock 312 in FIG. 12. Walkway bar 292 or 392 is preferably bolted to links 281 to form in top view a rectangle in FIGS. 10, 11 and 14 of the pair of linkages 280 and bars 276 and 292 and in FIGS. 12–14 of the pair of linkages 380 and bars 376 and 392. This rectangular construction has the advantages of: (1) rigidly tying together the pair of parallelogram linkages in a strong rectangular construction to maintain the parallel construction of the parallelograms without requiring accurate spacing between or location of ground stakes 288 and their connected links 281, and (2) providing a pivot and base for walkway 290 to be supported on the bank end to pivot as a link of the associated parallelogram. However, if desired, bars 376, 292 and 392 may be eliminated to make a simpler construction. Then, links 384 are bolted directly to the sides of dock member 314, and each ground stake 281, 288 must be accurately located in the ground to maintain the alignment between parallelogram linkages 280 or 380. However, now ground G need not have a straight path between the stakes since bar 292 is not used.

Torque resisting portion means 334 and support structure 318 in dock member 314 is shown in FIGS. 12–14. Each link 384 in FIGS. 13 and 14 has horizontal arm 384a secured thereto (to form a generally L-shape in the vertical plane) and secured to the bottom of deck portion 16 by a rigid connection, such as by welding or bolting. This rigid connection of arm 384a preferably extends across substantially the full transverse dimension of deck portion 16 with securement points being at spaced apart points across this entire transverse dimension. Then, these two arms 384a, located under opposite ends of deck portion 16 in FIG. 12, will be caused by the pair of parallelogram linkages 380 to remain parallel to each other and in the same horizontal plane during rise and fall of water W causing dock member 314 to float at different levels L. Hence, these arms 384a will resist relative torsion twisting movement by the two ends of deck portion 16 in dock 312 about the longitudinal dock axis so as to serve here as said torsion resisting means. Hence, dock 312 can use deck portion 16 without a support structure comprising torsion tube 36 of torsion resisting portion means 34 or crossed tubes 136 of torsion resisting portion means 118 since it has its own torsion resisting portion means 334 and support structure 318 for deck portion 16 as thus described earlier in this paragraph. However, if so desired, dock 312 may have additional resistance to torsion and twisting by using dock member 14 or 114 having respectively support structure 18 or 118 with torsion resisting means 34 and 134, instead of only deck portion 16 found in support structure 318 of the aforedescribed dock member 314.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A dock, including:
 a dock member, comprising:
  a deck portion, and
  a support structure for said deck portion;
  said support structure including:
   a torsion resisting portion means resisting relative torsional movement of longitudinally spaced apart transversely extending sections of the deck portion, and
   connecting means rigidly connecting said deck portion and torsion resisting portion means so that the torsion resisting portion means resists any twisting force applied to the deck portion; and
 anchoring means for anchoring the torsion resisting portion means and one edge of the deck portion to the ground against twist so that the torsion resisting portion means will resist any twisting force applied to the deck portion and for anchoring the dock against movement by current flow;
said deck portion comprising
a plurality of C-shaped channel deck floor members, and
a plurality of notched rigidifying members,
said members, channels and notches being constructed so that said C-shaped channels interlockably fit into said notches with the deck floor members forming a planar walkway on one side and being rigidly connected on the other side by said rigidfying members spaced apart, parallel and extending generally perpendicular to said deck floor members,
a longitudinal edge closer member channel shaped to fit into notches in corresponding ends of said rigidifying members,
a pair of U-shaped channeled members telescoped over the ends of all of the aforedescribed deck members and said edge closer members to hold them in a rigid deck portion, and
two corner gussets secured to the two corners of each of said U-shaped channeled members for rigidifying them.

2. A deck for a dock member, comprising:
a plurality of C-shaped channel deck floor members, and
a plurality of notched rigidifying members,
said members, channels and notches being constructed so that said C-shaped channels interengageably fit into said notches with the deck floor members forming a planar walkway on one side and being rigidly connected to the other side by said rigidifying members spaced apart, parallel and extending generally perpendicular to said deck floor members,
said rigidifying members having aligned and parallel notches in top and bottom surfaces in corresponding ends,
a longitudinal edge closer member channel shaped and fitting into said notches in corresponding ends of said rigidifying members.

3. A dock, including a dock member, comprising:
a deck portion, and
a support structure for said deck portion;
said support structure including:
 a torsion resisting portion means resisting relative torsional movement of longitudinally spaced apart transversely extending sections of the deck portion, and
 connecting means rigidly connecting said deck portion and torsion resisting portion means so that the torsion resisting portion means resists any twisting force applied to the deck portion;
 float means supporting said dock under said deck portion;
 anchoring means for anchoring one edge of the deck portion to the ground;
 said anchoring means including means for keeping the deck portion always floating in a level position during rise and fall of the water level and dock floating position,
 said anchoring means including two parallelogram linkages with each parallelogram linkage having four links pivotally connected together about horizontal axes in a parallelogram shape located in a generally vertical plane,
 one of said links being securable to the ground and the opposite of said links being rigidly connected with said deck portion so that upon rise and fall of the water level, the linkage will keep the deck portion floating in a level position,
 said two parallelogram linkages being generally horizontally aligned, having corresponding pivots coaxial, and having one corresponding link in each rigidly connected with said deck portion along one dimension of said deck portion; and
 a walkway operatively connectable to said shore ground and connected with said deck portion between said linkages to provide a stable walkway with the linkages maintaining said one dimension horizontal upon rise and fall of the water and of the floating level of the dock.

4. A dock, including a dock member, comprising:
a deck portion, and
a support structure for said deck portion;
said support structure including:
 a torsion resisting portion means resisting relative torsional movement of longitudinally spaced apart transversely extending sections of the deck portion, and
 connecting means rigidly connecting said deck portion and torsion resisting portion means so that the torsion resisting portion means resists any twisting force applied to the deck portion;
 float means supporting said dock under said deck portion; and
 anchoring means for anchoring one edge of the deck portion to the ground;
 said anchoring means including means for keeping the deck portion always floating in a level position during rise and fall of the water level and dock floating portion,
 said anchoring means including two parallelogram linkages with each parallelogram linkage having four links pivotally connected together about horizontal axes in a parallelogram shape located in a generally vertical plane,
 one of said links being securable to the ground and the opposite of said links being rigidly connected with said deck portion so that upon rise and fall of the water level, the linkage will keep the deck portion floating in a level position,
 said two parallelogram linkages being generally horizontally aligned, having corresponding pivots coaxial, and having one corresponding link in each rigidly connected with said deck portion along one dimension of said deck portion;
 said one link of each of said linkages being rigidly connected to said deck portion at spaced apart points transverse to said one dimension in said torsion resisting portion means.

5. A dock member, comprising:
a deck portion; and
a support structure for said deck portion, including
a torsion resisting portion means resisting relative torsional movement of longitudinally spaced apart transversely extending sections of the deck portion, and
connecting means rigidly connecting said deck portion and torsion resisting portion means so that the torsion resisting portion means resists any twisting force applied to the deck portion;
said torsion resisting portion means and connecting means including two U-shaped tubes arranged in a cross under said deck portion, secured together at their cross intersection and having their distal ends secured to the bottom corners of the deck portion.

6. A dock member, comprising:
a deck portion; and
a support structure for said deck portion, including:
 a torsion resisting portion means resisting relative torsional movement of longitudinally spaced apart transversely extending sections of the deck portion, and
 connecting means rigidly connecting said deck portion and torsion resisting portion means so that the torsion resisting portion means resists any twisting force applied to the deck portion;
 said torsion resisting portion means and connecting means including two bars arranged in a cross under said deck portion and having their distal ends secured near the opposite bottom corners of the deck portion.

7. A dock member, comprising:
a deck portion; and
a support structure for said deck portion, including:
 a torsion resisting portion means resisting relative torsional movement of longitudinally spaced apart transversely extending sections of the deck portion, and
 connecting means rigidly connecting said deck portion and torsion resisting portion means so that the torsion resisting portion means resists any twisting force applied to the deck portion;
said torsion resisting portion means and connecting means including at least one bar located under said deck portion and having its distal ends secured near diagonally opposite bottom corners of the deck portion.

References Cited
UNITED STATES PATENTS

| | | | |
|---|---|---|---|
| 2,768,600 | 10/1956 | Harris | 61—48 X |
| 2,774,322 | 12/1956 | Harris | 61—48 X |
| 3,015,135 | 1/1962 | Dean et al. | 52—76 |
| 3,210,110 | 10/1965 | Chieger | 61—48 X |
| 3,306,053 | 2/1967 | Fulton | 61—48 |
| 3,455,115 | 7/1969 | Watts et al. | 61—48 |
| 2,028,019 | 1/1936 | Settle et al. | 52—657 X |
| 3,073,274 | 1/1963 | Lamb | 114—.5 X |
| 3,113,434 | 12/1963 | Phillips et al. | 52—493 |
| 3,336,705 | 8/1967 | Vecchiarelli et al. | 52—493 X |

JACOB SHAPIRO, Primary Examiner

U.S. Cl. X.R.

52—493, 494, 627; 114—.5